United States Patent

Wurz et al.

[11] Patent Number: 5,979,761
[45] Date of Patent: Nov. 9, 1999

[54] BAR CODE LASER SCANNER HAVING A PLURALITY OF ADJUSTABLE MIRRORS

[75] Inventors: David A. Wurz, Doylestown, Pa.; Michael Veksland, Marlton, N.J.

[73] Assignee: Accu-Sort Systems, Inc., Telford, Pa.

[21] Appl. No.: 08/970,726

[22] Filed: Nov. 14, 1997

Related U.S. Application Data

[60] Provisional application No. 60/031,307, Nov. 18, 1996.

[51] Int. Cl.⁶ .................................................. G06K 7/10
[52] U.S. Cl. ...................... 235/454; 235/462.37; 359/201
[58] Field of Search .............................. 235/454, 462.14, 235/462.36, 462.38, 462.39, 462.4, 462.43, 462.37; 359/201, 202

[56] References Cited

U.S. PATENT DOCUMENTS

| | | | |
|---|---|---|---|
| 3,947,816 | 3/1976 | Rabedeau | 340/462.4 |
| 4,006,343 | 2/1977 | Izura et al. | 235/470 |
| 4,043,632 | 8/1977 | Jeffery et al. | 359/217 |
| 4,093,865 | 6/1978 | Nickl | 250/566 |
| 4,795,224 | 1/1989 | Goto | 350/6.3 |
| 4,871,904 | 10/1989 | Metlitsky | 235/462.38 |
| 5,000,529 | 3/1991 | Katoh et al. | 350/6.7 |
| 5,012,079 | 4/1991 | Singh et al. | 235/462.39 |
| 5,132,524 | 7/1992 | Singh et al. | 235/462.39 |
| 5,229,591 | 7/1993 | Heiman et al. | 235/472 |
| 5,286,961 | 2/1994 | Saegusa | 235/467 |
| 5,296,691 | 3/1994 | Waldron et al. | 235/462 |
| 5,321,246 | 6/1994 | Shepard et al. | 235/462.38 |
| 5,464,972 | 11/1995 | Massieu et al. | 235/462 |
| 5,478,998 | 12/1995 | Charych et al. | 235/462.13 |
| 5,481,097 | 1/1996 | Tafoya | 235/462 |
| 5,600,120 | 2/1997 | Peng | 235/462.43 |

*Primary Examiner*—Michael G. Lee
*Assistant Examiner*—Jared J. Fureman
*Attorney, Agent, or Firm*—Volpe and Koenig, P.C.

[57] ABSTRACT

An optical scanner which includes a rotating polygonal mirror and a series of adjustable mirror assemblies which provide an adjustable X pattern. Adjustment of the X pattern permits the scanner to be optimized to different scanning applications.

28 Claims, 12 Drawing Sheets

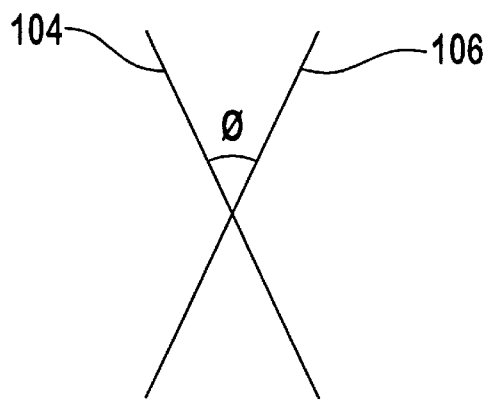
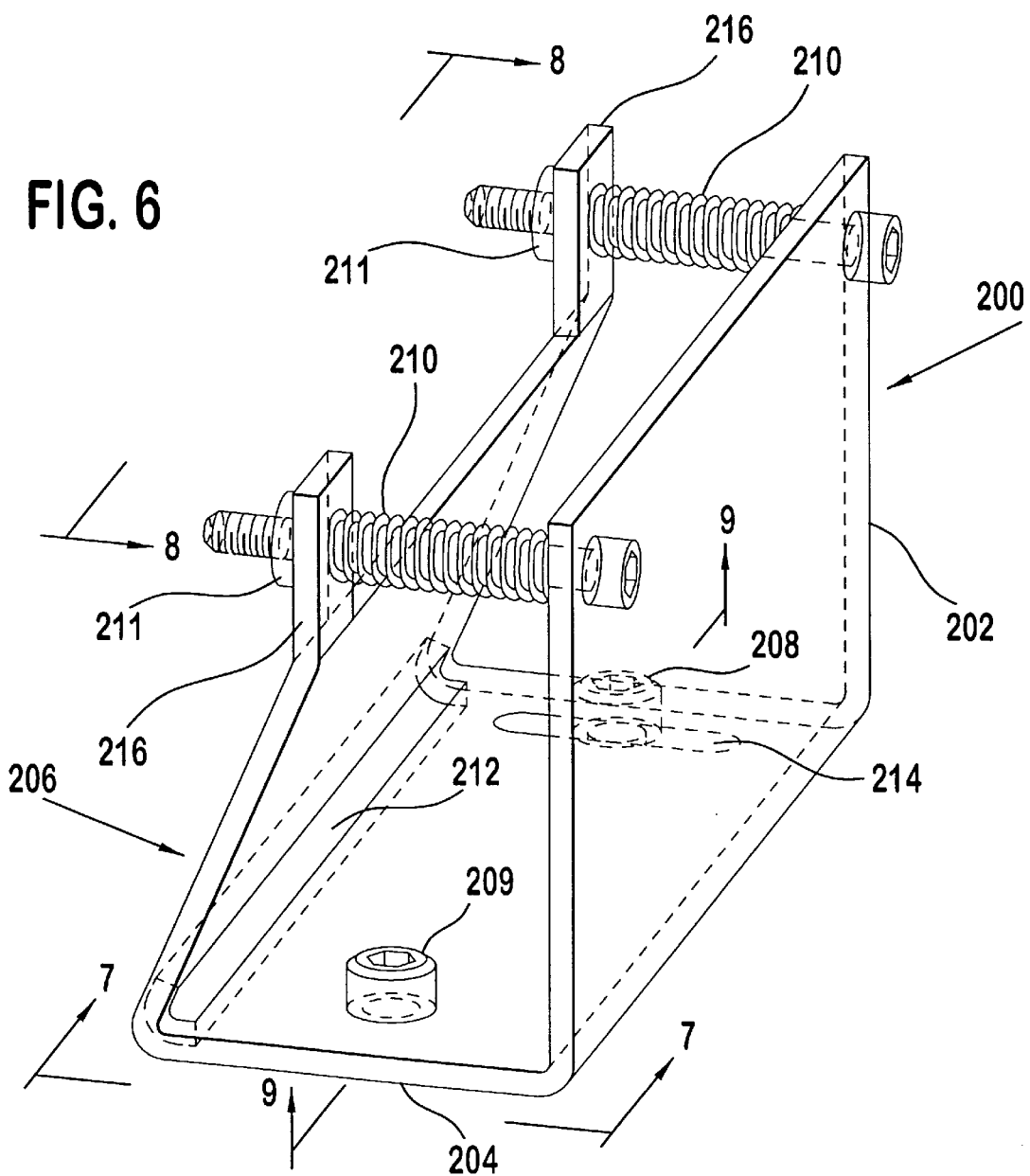

BAR CODE LASER SCANNER HAVING A PLURALITY OF ADJUSTABLE MIRRORS

This application claims the benefit of U.S. Provisional Application No. 60/031,037, filed Nov. 18, 1996.

BACKGROUND OF THE INVENTION

1. Field of the Invention

This invention generally relates to laser scanning systems utilizing laser light sources for reading coded symbologies of different light reflectivity. More particularly, the invention pertains to laser scanning systems wherein adjustment of the intensity or spatial coverage of the beam is utilized to effect the detection and reading of coded symbologies.

2. Description of Related Art

Coded symbologies, such as bar code symbols, are commonly used in a number of applications to uniquely identify an item or group of items. Bar code symbols typically comprise a combination of black bars of varying widths alternating with white spaces of varying widths. A unique combination of bars and spaces represents the encoded information. Bar code symbols are typically affixed to an item using a label, or imprinted directly upon the item. The reading and decoding of bar code symbols is used to yield information concerning the item, such as a description of the item's destination, origination or particular characteristics such as color, price or quantity. Due to their inherent efficiency in tracking items, bar code symbols have been widely used for document tracking, inventory control, manufacturing control and employee identification.

Bar code symbol scanners are the devices used to read the bar code symbols to retrieve the desired information. The bar code symbol is illuminated by a beam of coherent light, such as a laser, that sweeps across the bar code symbol. The scanner detects the light reflected from the bar code symbol and determines contrasts between the bars, areas having a lower reflectivity, and the spaces, areas having a higher reflectivity.

An important consideration in using scanning systems of this type is the optimal orientation of the scanning beam with respect to the bar code symbol. It is preferable to have the scanning region cover the entire bar code symbol to ensure high accuracy. However, in many prior art scanning systems, the scanner provides only a single scan line and the bar code symbol must be precisely oriented in relation to the defined scanning region. Many current laser scanners of this type are adequate for bar code symbols which are presented in a "ladder" orientation wherein the bar code symbol resembles a vertical ladder as it moves by the scanner. In this configuration, the laser repeatedly scans from the top of the bar code symbol to the bottom as it passes the scanner. Even though the scan beam repeatedly scans vertically, the bar code symbol must still be oriented within the field of the view of the scan beam. The time consumed in precisely aligning the bar code symbol delays scanning and prevents high-speed bar code symbol scanning.

Bar code symbols may also be oriented in a "picket fence" orientation wherein the bar code symbol resembles a picket fence as it moves by the scanner. In applications where the bar code symbol is oriented as such, the scanner may be rotated 90 degrees to scan horizontally across the bars of the coded symbol. However, one problem with this approach is that the same horizontal portion of the bar code symbol is repeatedly scanned. Accordingly, a "no read" may result if the printing quality suffers at that portion of the code. Additionally, the bar code symbols must still be precisely aligned with the scanner.

Although there are some prior art systems that do not require as precise orientation, these systems have not proven to be wholly satisfactory. These systems have incurred various problems, including gaps in the scanning pattern, the requirement of a large minimum bar height, and a limited range of orientation. One such scanning technique includes redundant sweeps across the entire bar code symbol by the laser to assure an accurate reading of the bar code symbol. The redundant scanning avoids misreading of a bar code symbol due to possible localized width inaccuracies in the bar code symbol. However, no reconstruction of the bar code symbol is done. This method is best suited for reading bar code symbols which have been pre-positioned along the scan line of the sweeping laser beam.

It is not always possible to control the orientation or location of the bar code symbol with respect to the scan line of the scanning device. In applications where the orientation or location of the bar code symbol is not constant, two other scanner type options are available: the raster mirror wheel and the vibrating vane.

A scanner employing a raster mirror wheel projects multiple parallel scanning lines instead of a single scanning line. As a result, the raster mirror wheel scans more than one part of the bar code symbol and information corresponding to a part of the label which has poor print quality may be ignored. The raster mirror wheel is also beneficial when there is inconsistent placement of the codes since it provides a larger scanning region.

However, the scanning region for raster mirror wheels is still substantially limited. Raster lines are evenly spaced over a predefined area and the number of raster lines is limited to the number of facets on the mirror wheel. To prevent bar code symbols with small heights from passing between the raster lines, the distance between them must remain small. As a result, the scanning region, while larger than a single scan line, remains fairly small.

Use of a vibrating vane which is attached to a line scanner to create a variable raster can alleviate this limitation to some extent. The vibrating vane includes an additional mirror positioned in the beam path after the mirror wheel. The additional mirror continuously rotates a certain number of degrees, then reverses direction and rotates back to its origin. As a result, the number of scan lines is not limited to the number of facets on the mirror wheel and the vibrating vane has essentially an infinite number of raster lines. This makes the scanner more reliable in many picket fence applications and applications having inconsistent placement of the codes.

The vibrating vane, however, has substantial limitations. Bar code symbols with small bar heights require the scan lines to be close together. To compensate for this, either the sweep distance of the vane must be reduced or the frequency of the sweep must be reduced, thereby reducing the maximum conveyor speed. The orientation range of the bar code symbol is also limited to allow a scan line to pass through the entire code. As a result, tradeoffs must be made between minimizing bar code symbol height, maximizing conveyor speed and minimizing placement variation.

One current scanning system that requires less precise orientation is an "X" pattern scanner. An X pattern scanner with reconstruction software permits bar code symbols to be read in an omni-directional (i.e. 360°) orientation, although the symbols are somewhat limited in that the scan pattern is fixed in size.

Thus it is desirable to have a scanning system which solves the numerous shortcomings associated with current scanning systems.

SUMMARY OF THE INVENTION

An optical scanner for scanning coded symbologies using a laser beam to read a coded symbology comprises a light source, a rotating polygonal mirror, a plurality of adjustable mirror assemblies and a photodetector for detecting light reflected by the coded symbology. The adjustable mirror assemblies have different inclination angles from each other and are adjustably positioned to receive reflected light from the rotating polygonal mirror to produce an adjustable X pattern.

Accordingly, it is an object of the present invention to provide a scanning system with an adjustable X pattern to handle a variety of scanning situations.

BRIEF DESCRIPTION OF DRAWINGS

FIG. 5 is a schematic of the scanning pattern of the first embodiment;

FIG. 6 is a perspective view of the adjustable mirror made in accordance with the teachings of the present invention;

DETAILED DESCRIPTION OF THE PREFERRED EMBODIMENT

The invention will be described with reference to drawing figures wherein like numerals represent like elements throughout.

Figure 1:
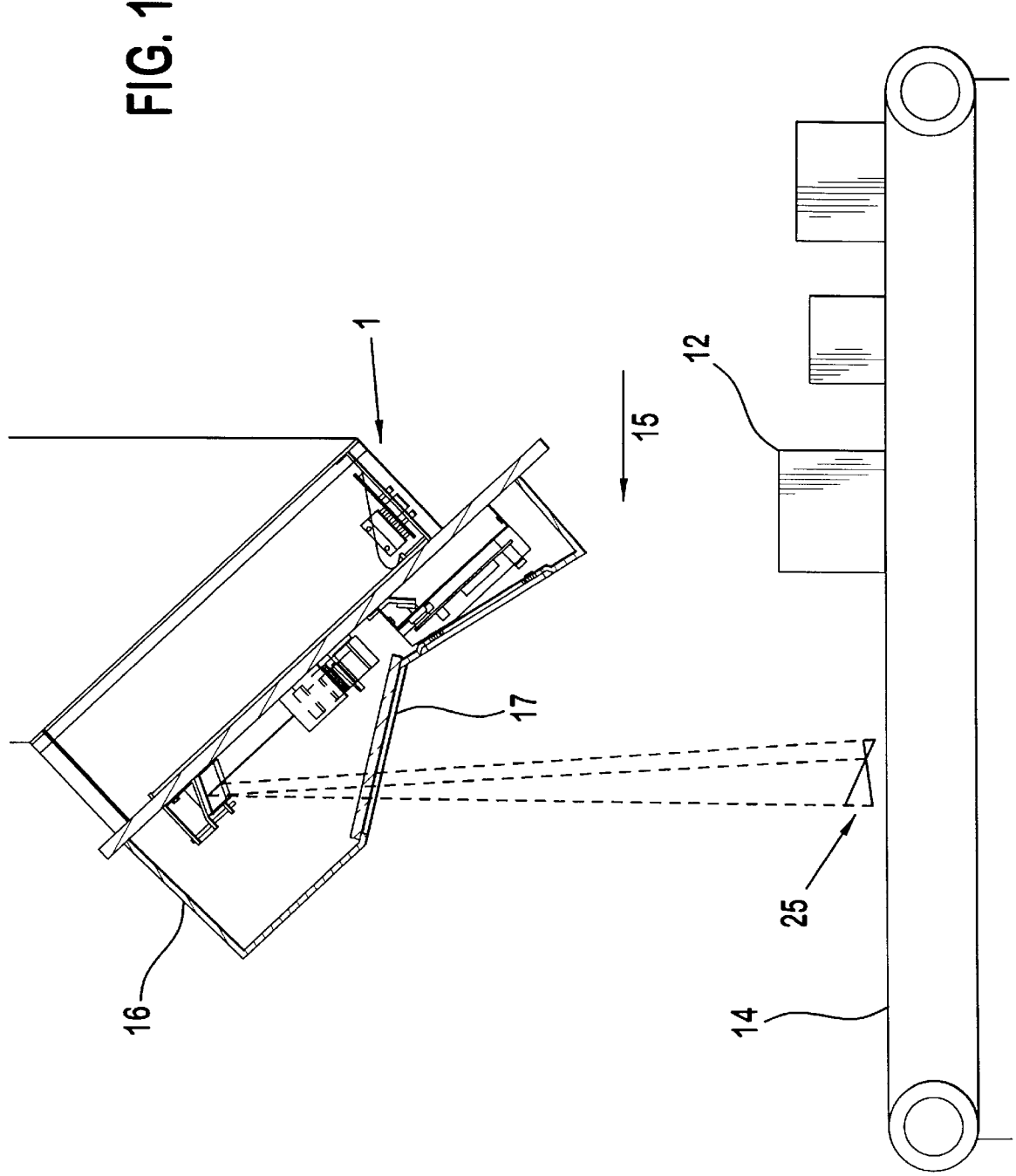
FIG. 1 shows a scanning system for reading coded indicia made in accordance with the teachings of the present invention.

A scanning system 1 made in accordance with the teachings of the present invention is shown in FIG. 1. The scanning system 1 is particularly adapted for scanning coded symbologies, preferably bar code symbols, placed on articles 12 traveling on a conveyor belt 14 moving in the direction of arrow 15. The scanning device 1 is enclosed in a rigid housing 16 having a transparent read window 17. In operation, the scanning system 1 provides an adjustable X pattern 25 through the read window 17 for the detection of a bar code symbol.

Figure 2:
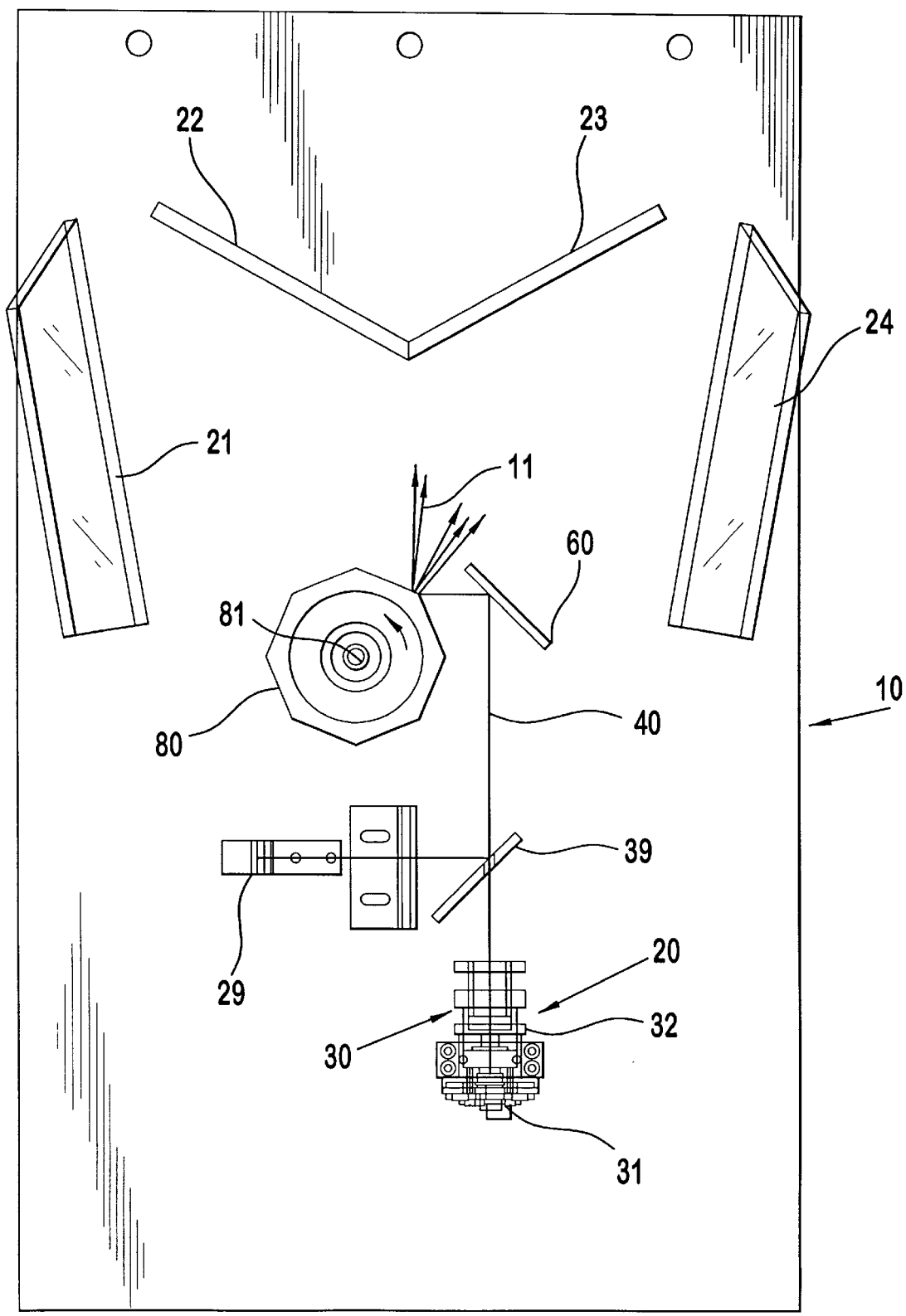
FIG. 2 is a layout diagram of the preferred embodiment of the scanning system made in accordance with the teachings of the present invention.

A first embodiment of the present invention is shown in FIG. 2. The scanning module 10 includes a light source 20, an apertured mirror 39, a deflecting mirror 60, a rotating polygonal mirror 80, a plurality of adjustable mirrors 21, 22, 23 and 24 and a photodetector 29. The light source 20 includes a lens assembly 30 and a laser diode 31 to produce a coherent light beam 40. The size and power of the laser diode 31 depends upon the particular application.

In operation, the light source 20 produces the beam 40 which passes through an aperture in mirror 39 before being deflected by the deflecting mirror 60 onto the rotating polygonal mirror 80. The polygonal mirror 80 is mounted on a shaft 81 connected to a controllable DC motor (not shown). The rotating mirror 80 has a plurality of reflective facets. The beam 40 striking the rotating polygonal mirror 80 produces a scan line 11 which sweeps in the direction of rotation of the polygonal mirror 80 to strike the series of adjustable mirrors 21, 22, 23 and 24.

Figure 3:
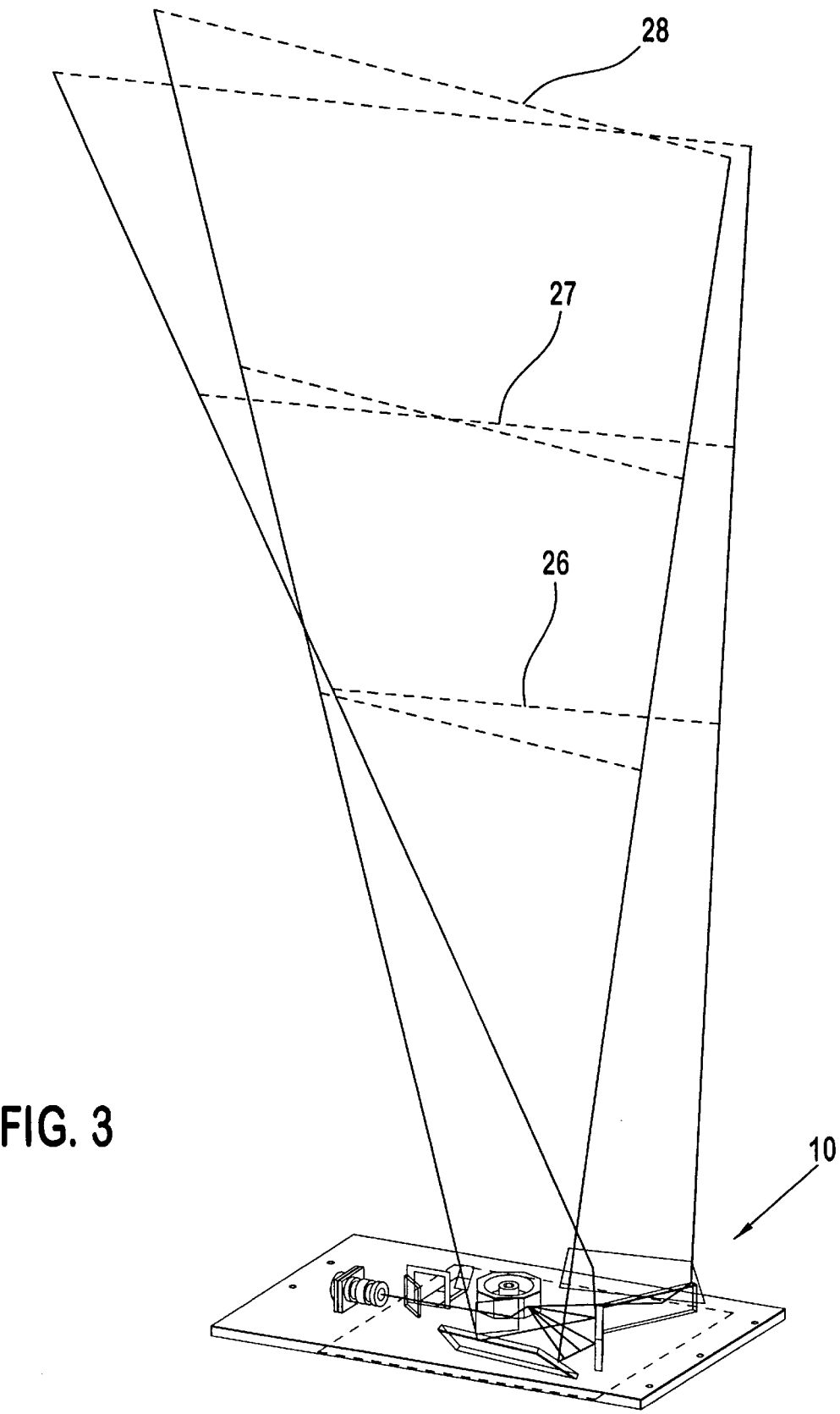
FIG. 3 shows, in perspective, a first embodiment of the scanning system for reading coded indicia made in accordance with the teachings of the present invention.
Figure 4:
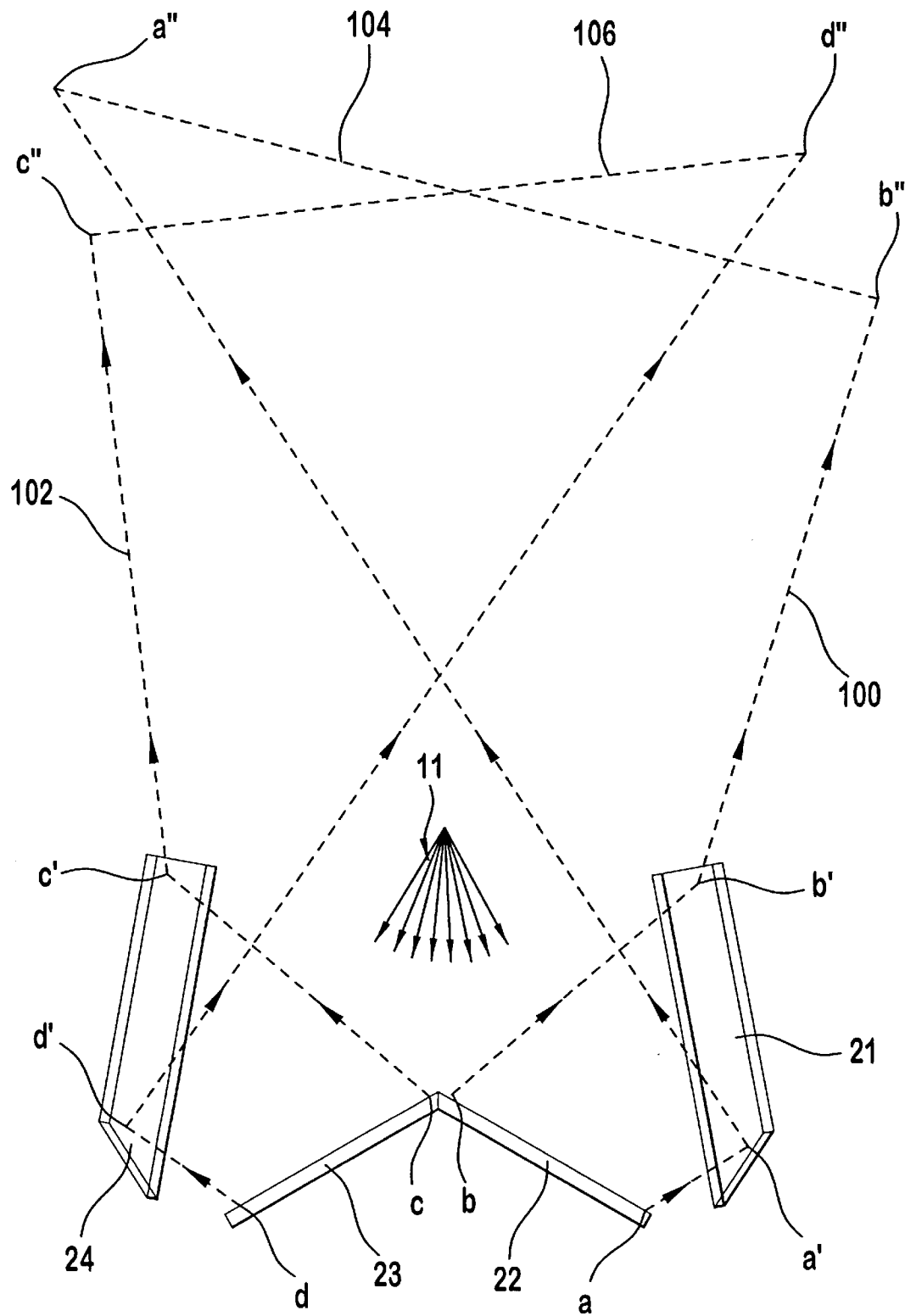
FIG. 4 is a schematic layout of the reflected light beams.

Each of the mirror assemblies 21, 22, 23 and 24 is adapted to reflect the beam 11 at a different angle from the base reference plane depending on the assemblies' orientation. As shown in FIGS. 3 and 4, the adjustable mirrors 21, 22, 23 and 24 create an adjustable X pattern which is projected outward through the read window 17 of the scanning system 1.

In operation, when a bar code symbol passes through the X scan pattern, a portion of the incident light is reflected back toward the scanner where it is detected by a beam collection apparatus, such as a photo detector 29, as shown in FIG. 2. The photo detector 29 converts the received detected light into an electrical signal, which is then converted into a digital signal by an analog to digital converter, (not shown). This signal is forwarded to a decoding means, (not shown), such as a microprocessor, which processes the signal to determine the data representative of the light and dark portions of the scanned coded symbology. The microprocessor uses the information to reconstruct the bar code symbol using reconstruction and decoding techniques that are well known to those of skill in the art.

The X pattern is produced from the sweep created by the beam 11 striking the mirror assemblies 21, 22, 23 and 24. Proceeding from right to left in FIG. 4, the beam 11 is swept on the mirrors 22 and 23. Beam 11 initially strikes mirror 22 at point a. This beam of light then strikes mirror 21 at point a' and is reflected to provide the initial point a" of the first leg 104 of the X pattern. As the beam 11 is swept across mirror 22 from point a to point b, the reflected light creates leg 104 between points a" and b". First leg 104 of the X moves diagonally from top to bottom. Beam 11 then sweeps across mirror 23 from point c to point d. This produces second leg 106 of the X which moves diagonally from bottom c" to top d" and intersects first leg 104. As shown more clearly in FIG. 5, the X pattern generally comprises legs 104 and 106 at an angle θ relative to one another. In the present invention, the mirrors 21–24 can be adjusted to vary the angle θ.

Adjustment of the X pattern is desirable to account for variations in the scanning process including conveyor speed, height of the bar code symbols and relative placement of the bar code symbol on the package. For example, at a given conveyor speed, as the angle decreases, the minimum bar height of the bar code symbol also decreases, but at the expense of a smaller placement variation. As the angle increases, the placement variation also increases, but at the expense of a larger minimum bar code symbol height. The X pattern is adjustable to optimize the required placement variation and minimize the required bar code symbol height.

The X pattern of the present embodiment is adjustable in the range of approximately 20 to 90 degrees between the two legs of the X pattern. With the range of 20 to 90 degrees, the X pattern is ideal for scanning bar code symbols in a picket fence orientation with a greater range of tilt than standard vibrating vane scanners can accommodate. At 90 degrees, the pattern is a standard X pattern and is suitable for omni-directional scanning.

Variation of the angle between the two legs of the X pattern also varies the displacement of the X pattern relative to the scanner module 10 as shown at positions 26, 27 and 28 in FIG. 3. The position of the scanner housing 16 relative to the conveyor can be adjusted to compensate for this displacement or to finalize the angle of the X pattern on the bar code.

Figure 7:
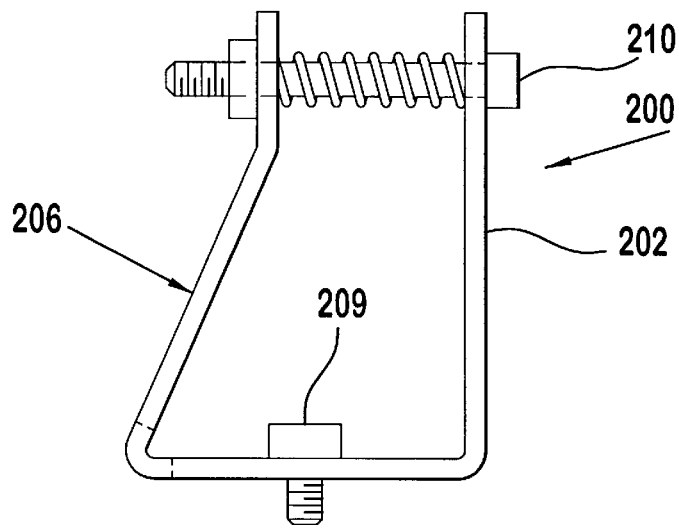
FIG. 7 is a view along line 7—7 of FIG. 6.
Figure 8:
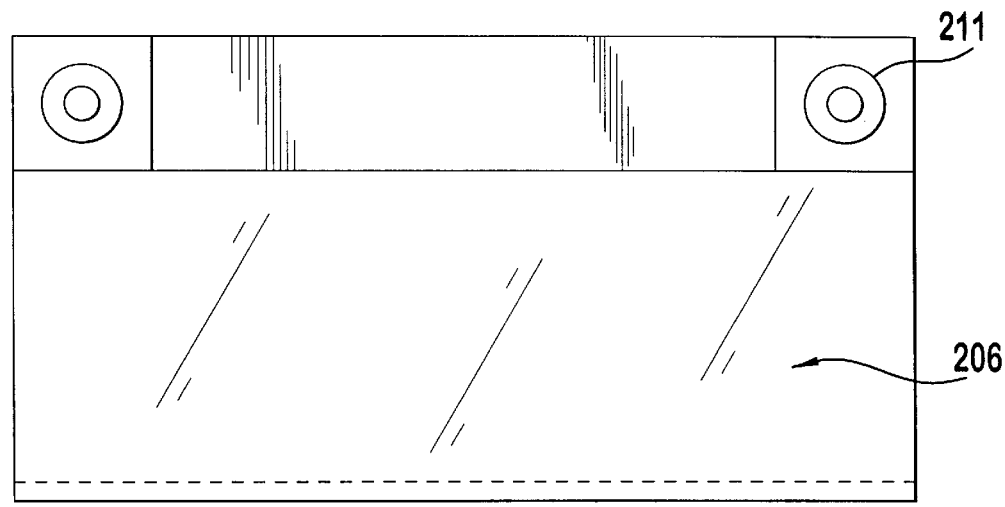
FIG. 8 is a view along line 8—8 of FIG. 6.

The adjustable mirror assemblies 200 are shown in greater detail in FIG. 6. The mirror assemblies 200 include a backing piece 202, a base plate 204 and a reflective mirror face 206. The reflective mirror face 206 is hingedly attached by a flexible piece 212 to the base plate 204. As shown in FIGS. 7 and 8, the reflective mirror piece 206 is further connected to the backing piece 202 by threaded bolts 210. The bolts 210 are positioned through tabs 216 which extend from the reflective portion 206. Subsequent tightening and untightening of the bolts 210 allows for tilting of the mirror piece 206 relative to the plane of the backing piece 202.

Figure 9:
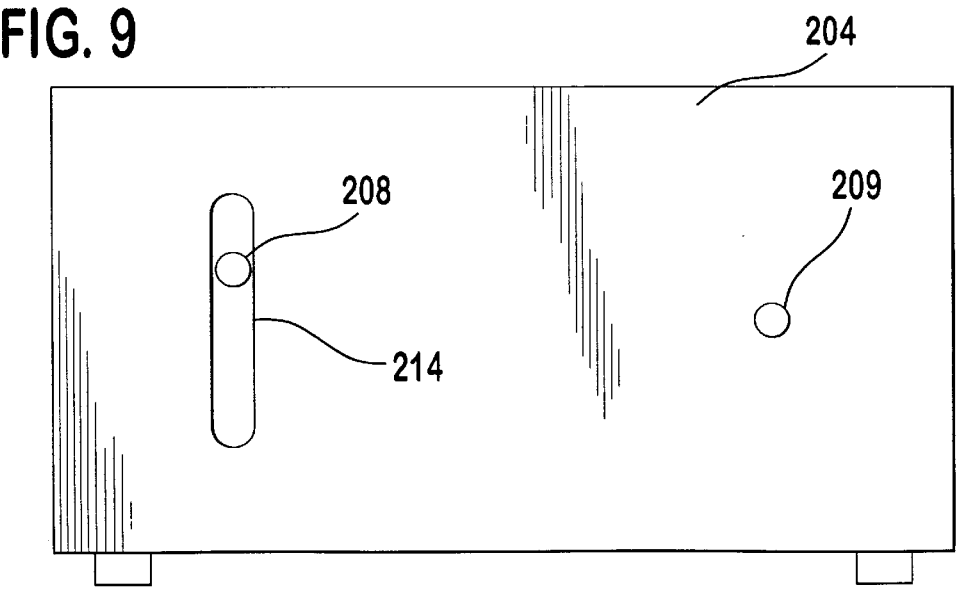
FIG. 9 is a view along line 9—9 of FIG. 6.

As shown in FIG. 9, the mirror assembly 200 is mounted on the scanning mechanism by bolts 208 and 209 through holes in the base plate 204. One of the bolts 208 is positioned for movement within a slot 214 cut into the base plate 204. Movement of the bolt 208 within the slot 214 permits pivotal adjustment of the mirror assembly 200. Adjustment is accomplished by loosening the bolt 208 and moving the mirror assembly 200 back or forth to the desired position in the slot 214. If desired, a second slot 214 may be provided such that the entire assembly 200 may be moved fore and aft. Accordingly, the reflective portion 206 can be tilted forward and backward by adjustment of the bolts 210 and pivoted by adjustment of the bolt 208 to change the orientation of the X pattern.

Figure 10:
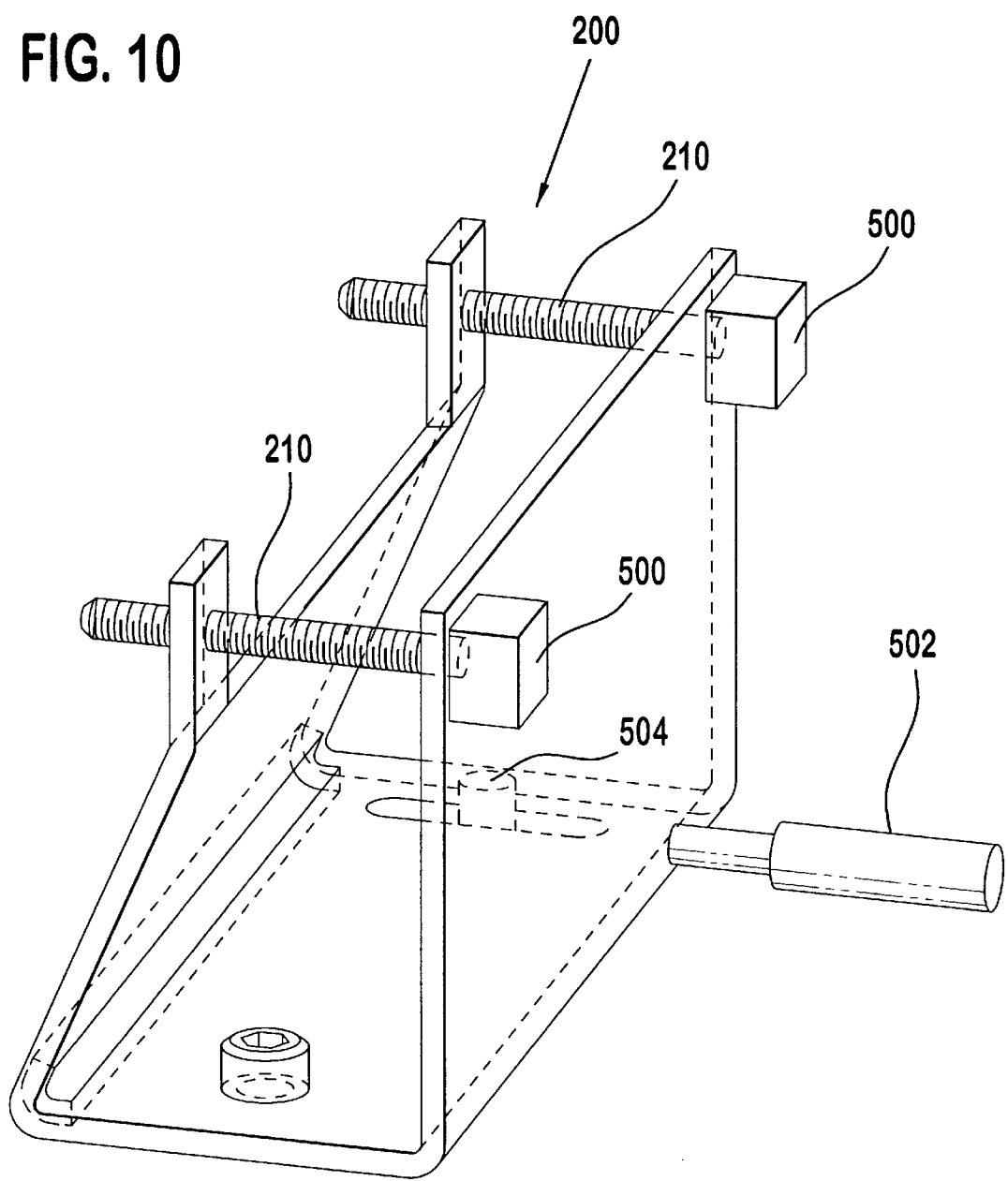
FIG. 10 is an isometric view of an alternative embodiment of the adjustable mirror made in accordance with the teachings of the present invention.

In an alternative embodiment, various components of the mirror assembly 200 are motorized to allow the mirror assembly 200 to be selectively adjusted automatically, depending upon the scanning application. An example of such an embodiment is shown in FIG. 10. An electric motor 500 is attached to each bolt 210 to provide automated adjustment of the angle of the reflective surface 206. A linear actuator 502 is provided to adjust the rotational orientation of the mirror assembly 200. In such an embodiment, the bolt 208 may be replaced by a pin 504. It will be understood by those skilled in the art that a number of different controls may be used to adjust the mirror assemblies 200.

Figure 11:
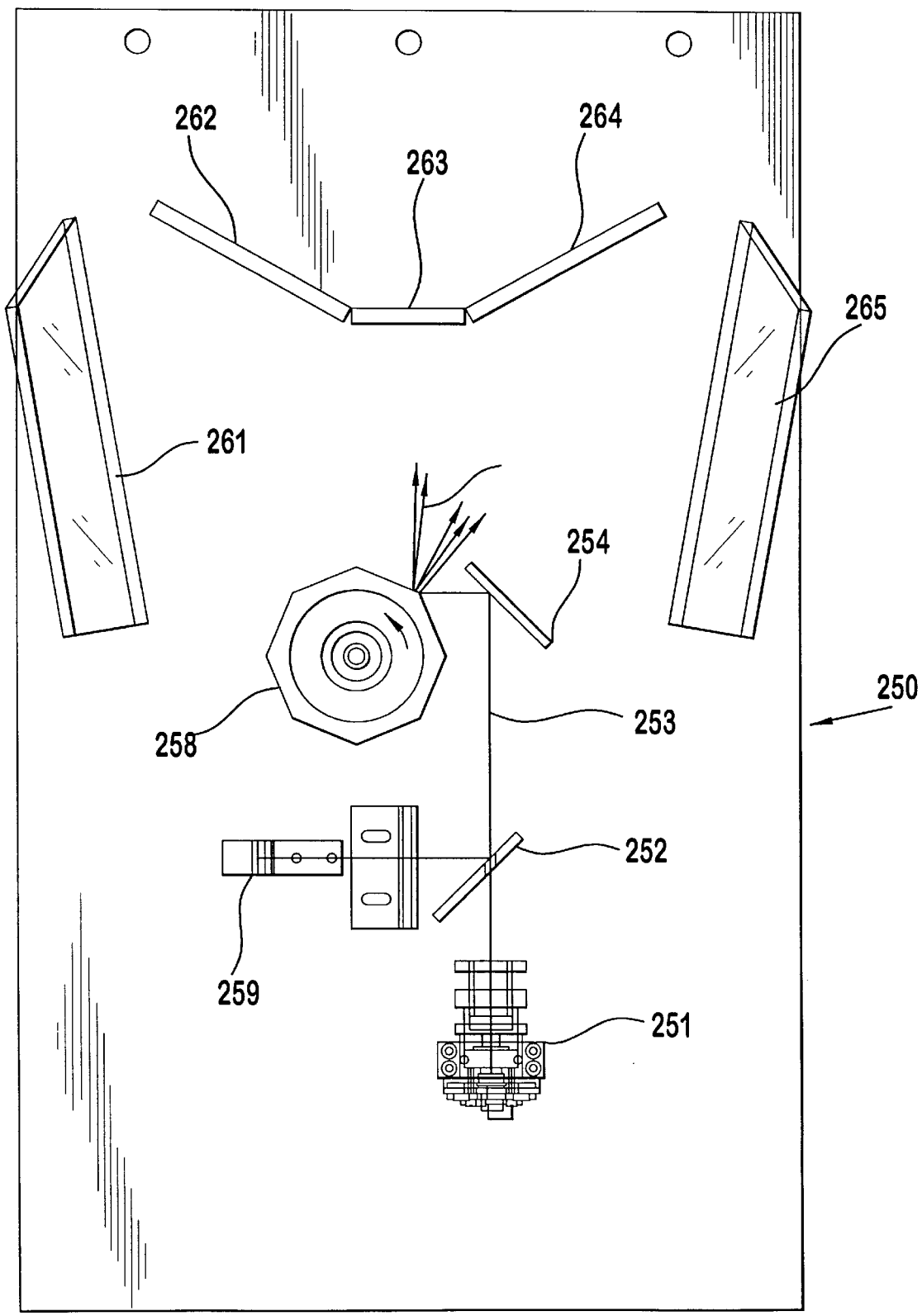
FIG. 11 is a layout diagram of a second embodiment of the scanning system made in accordance with the teachings of the present invention.

Referring to FIG. 11, there is shown a second embodiment of the present invention. In this embodiment, the scanning system 250 includes a light source 251, an appertured mirror 252, a deflecting mirror 254, a rotating polygonal mirror 258, a plurality of adjustable mirrors 261, 262, 263, 264 and 265 and a photo detector 259. The light source 251, such as a laser diode, produces a coherent beam of light 253 which is deflected by the deflecting mirror 254 to the rotating polygonal mirror 258. The rotating mirror 258 rotates to sweep the scan line 256 across the adjustable mirrors 261, 262, 263, 264 and 265. The adjustable mirrors 261, 262, 263, 264 and 265 create an X pattern which is adjustable in the range of approximately 20 to 90 degrees between the legs of the X.

Figure 12:
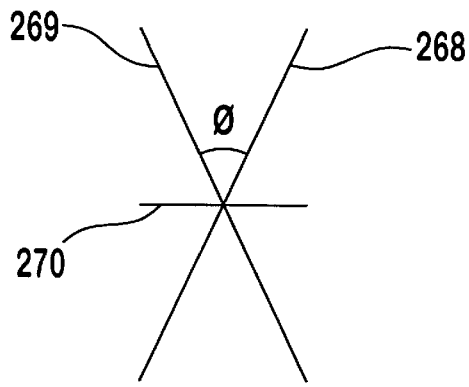
FIG. 12 is a schematic of the scanning pattern of the second embodiment.

As shown in FIG. 12, the X pattern in the present embodiment consists of two angled lines 268, 269 which intersect to form the shape of an "X" and a single straight line 270 running horizontally through the intersection of the two lines 268, 269. It should be recognized by those of skill in the art that X patterns can be created with a vertical bar or a horizontal bar. The X pattern which best fits a particular application is utilized. The addition of the third line 270 makes the scanning pattern omni-directional when used in conjunction with an angle θ of 60 degrees or greater. When θ is less than 60 degrees, the X pattern permits scanning of bar codes symbols in either a picket fence type orientation or a ladder orientation with a greater range of tilt than conventional scanners can accommodate.

Figure 13:
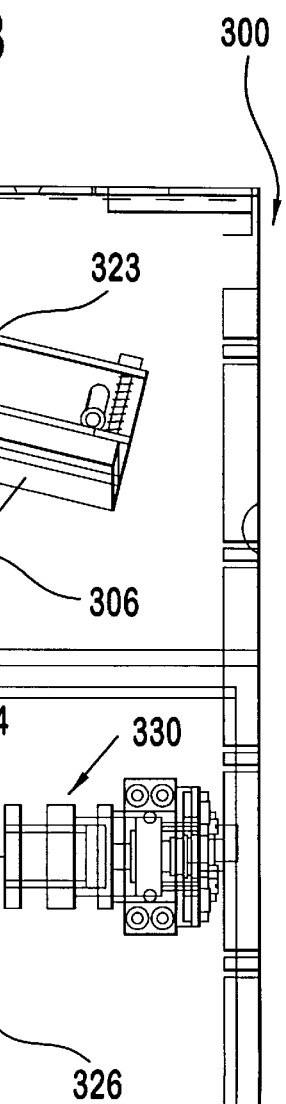
FIG. 13 is a simplified layout of a scanning mechanism of a third embodiment made in accordance with the teachings of the present invention.

A third embodiment of the present invention is shown in FIG. 13. The scanning system 300 includes a light source 330, an appertured mirror 304, a rotating polygonal mirror 316, a plurality of adjustable mirrors 321, 322 and 323 and a photo detector 326. The light source 330, such as a laser diode, provides a coherent beam of light 302 through an aperture in mirror 304. The rotation of the polygonal mirror 316 sweeps the beam 302 across the adjustable mirror assemblies 321, 322 and 323 as represented by lines 306. The adjustable mirror assemblies 321, 322 and 323 are oriented such that an X pattern is produced. Each of the mirror assemblies 321, 322 and 323 is adapted to reflect the beam 306 at a different angle from the base reference plane depending on the assemblies' orientation. Adjustment of the mirror assemblies 321, 322, and 323 allows the angle between the legs of the X pattern to be adjusted between approximately 5 and 20 degrees.

Figure 14:
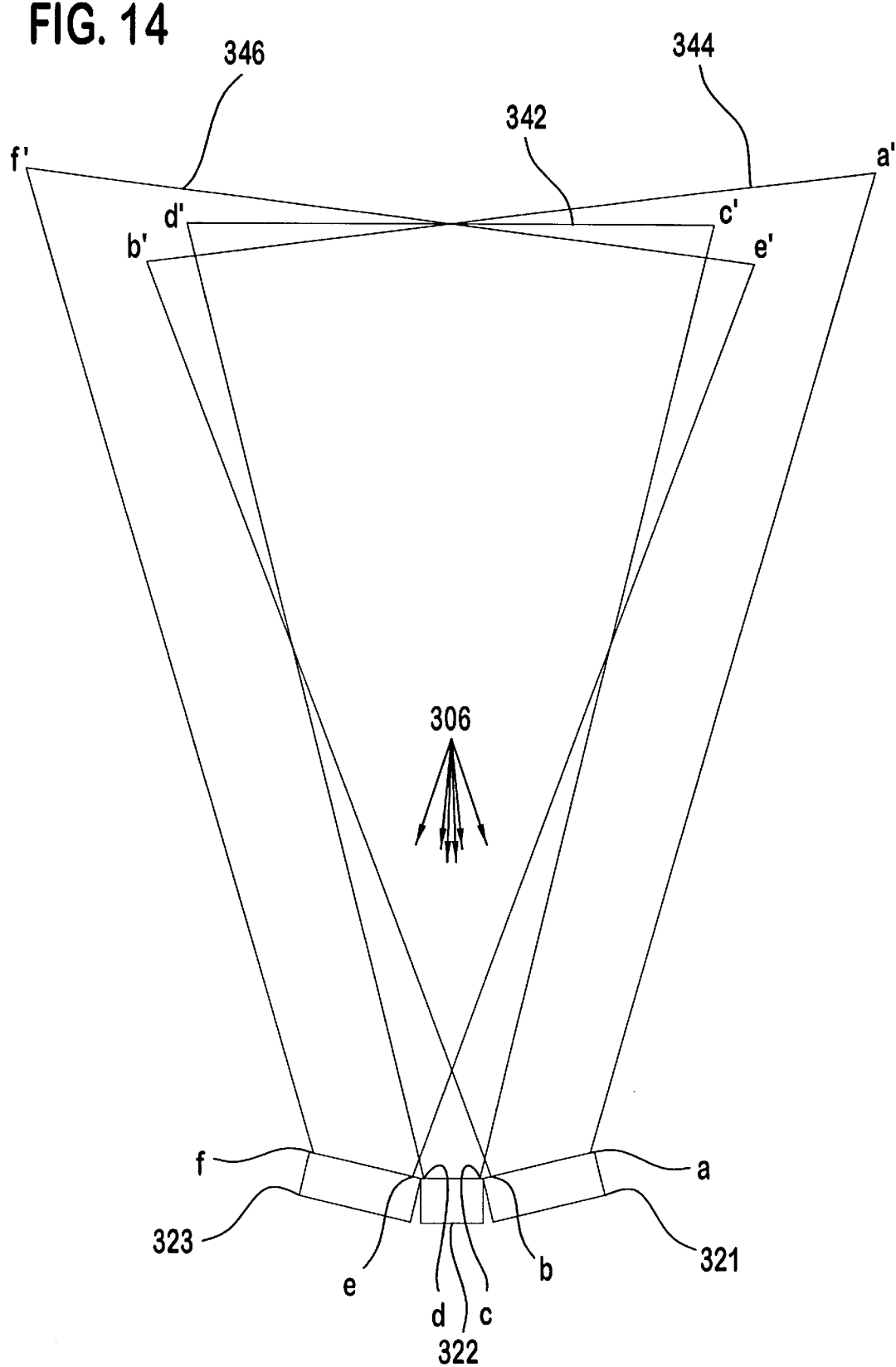
FIG. 14 is a schematic layout of the reflected light beams.

As shown more clearly in FIG. 14, the X pattern is produced from the sweep created by the beam 306 striking the mirror assemblies 321, 322 and 323. As the beam 306 sweeps across the mirror 321, from a to b, it produces the first leg 344 of the X which moves diagonally from top a' to bottom b'. The beam sweeps across mirror 322 from c to d to produce a straight vertical center line 342 from c' to d' which intersects the first leg 344. Finally, the beam 306 sweeps across mirror 323 from e to f to produce second leg 346 of the X which moves diagonally from bottom e' to top f' and intersects first leg 344.

Figure 15:
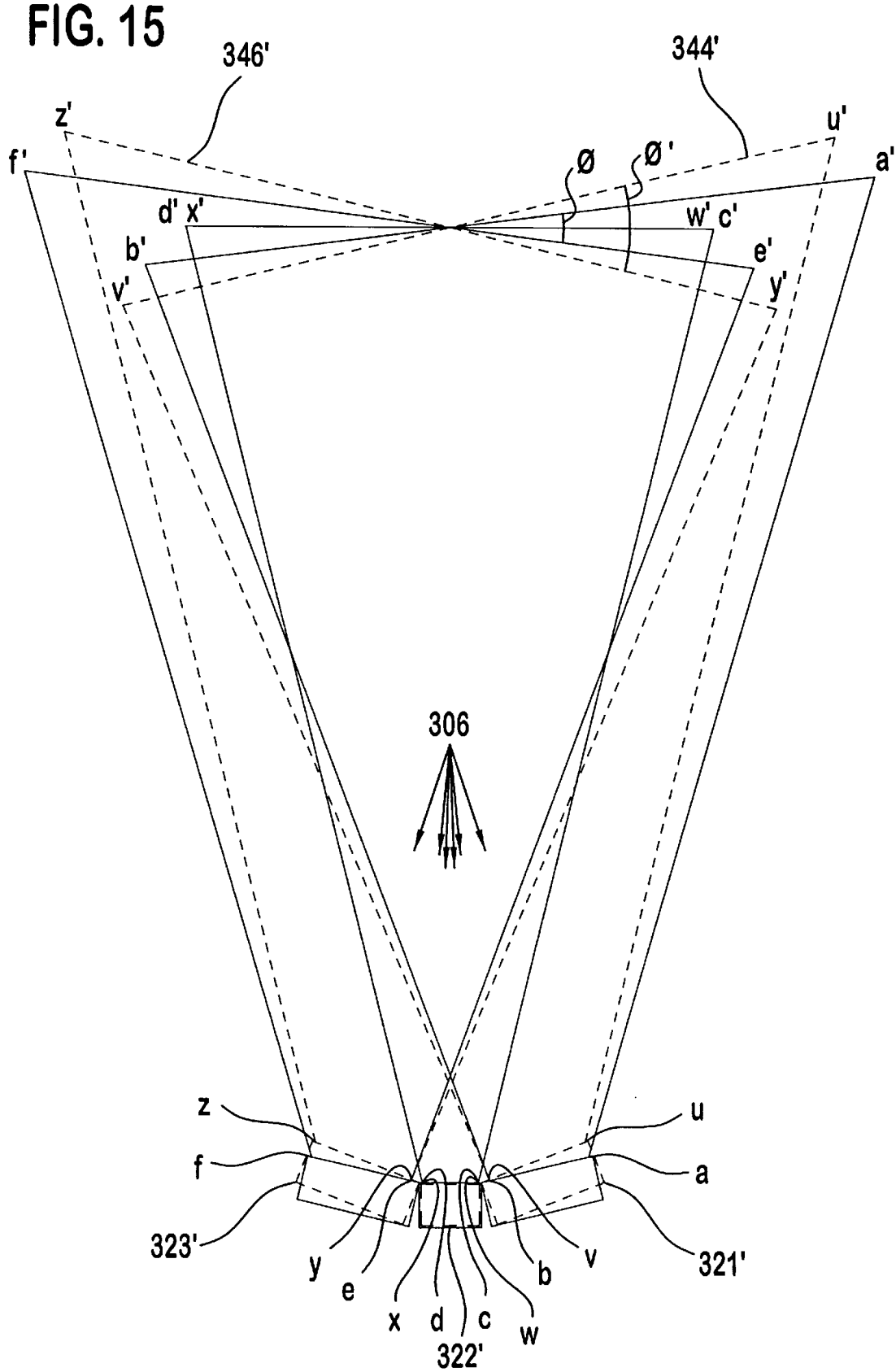
FIG. 15 is a schematic of how adjustment of the adjustable mirror changes the X scanning pattern.

As shown in FIG. 15, adjustment of mirrors 321 and 323 to the positions shown as 321' and 323' results in a modified X pattern. In this example, the adjusted mirrors 321' and 323' produce an X pattern with a larger angle θ' between the two legs 344', 346' then the angle θ produced by the mirrors 321, 323 in their original positions.

The angle θ between the two legs 344, 346 of the X pattern of the present embodiment pattern can be adjusted between approximately 5 and 20 degrees. A scanner with such an adjustable angle θ permits scanning of bar codes with minimal bar heights in ladder or picket fence orientation with a greater range of tilt than conventional scanners. This scanner is particularly suitable for two-dimensional bar code symbologies such as PDF-417.

In an alternate embodiment, the center line 342 is removed from the X pattern by removing the center mirror assembly 322. To compensate for the missing center mirror assembly 322, the mirrors 321 and 323 can be correspondingly lengthened.

Figure 16:
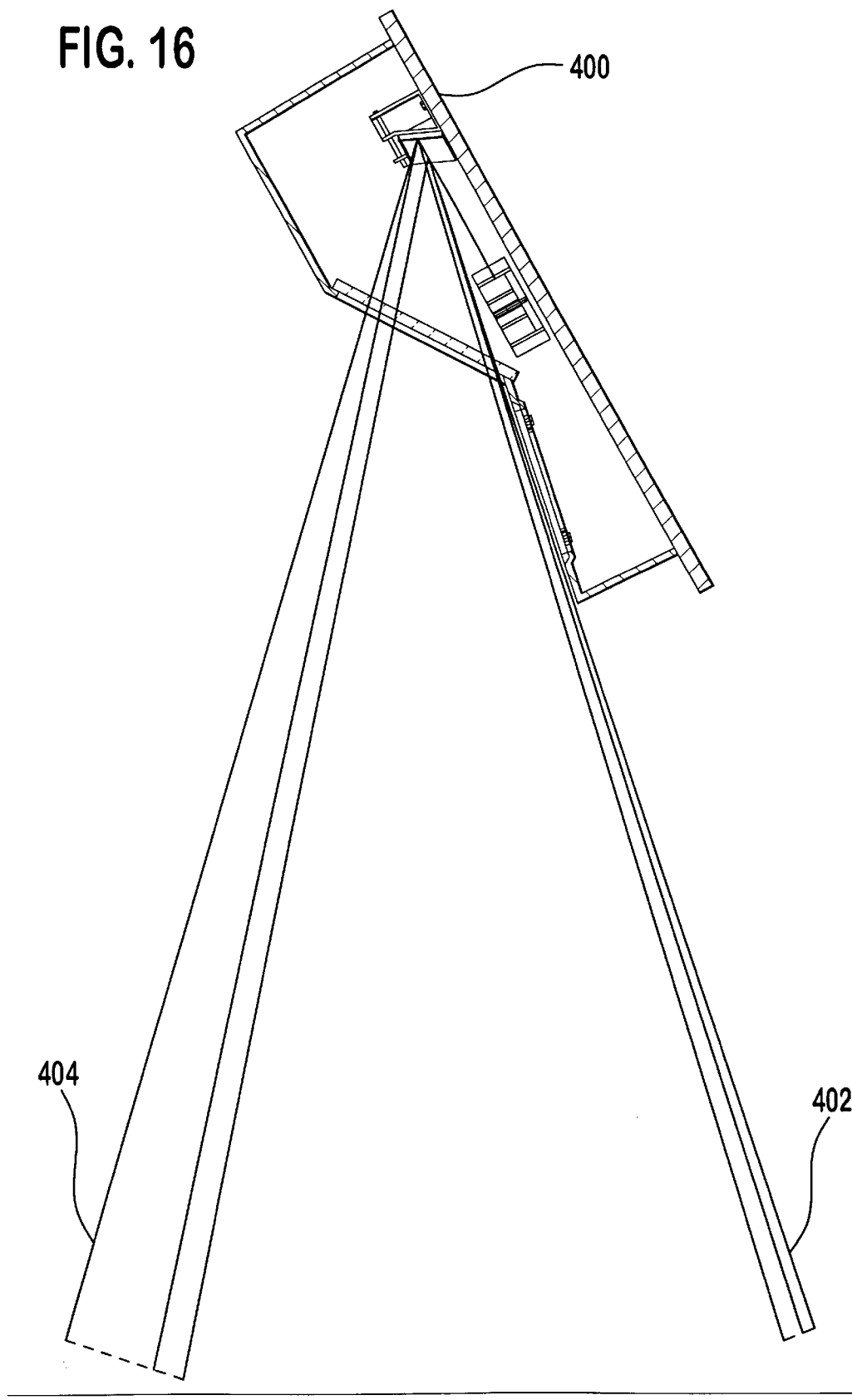
FIG. 16 shows a 5° and a 20° variation in the X scanning pattern.

Referring to FIG. 16, adjustment of the legs 344, 346 of the X pattern also changes the displacement of the X pattern.

For example, an X pattern with an angle θ of 5° between the two legs 344, 346, as shown at 402, and an X pattern with an angle θ of 20° between the two legs 344, 346, as shown at 404, have varying displacements with respect to the scanner housing 400. The scanner housing 400 may be correspondingly adjusted to keep the X scan pattern focused at a specific location.

Advantages of utilizing an adjustable X pattern include the ability to handle any tilt angle between the legs of the X pattern. As the bar code symbol moves thru the X pattern, the partial scans collected by the adjustable X pattern are combined and decoded by the data reconstruction software. Another advantage of the present invention is the elimination of moving parts, such as a vibrating vane type scanning attachment, which are expensive and prone to failure.

Although the invention has been described in part by making detailed reference to the preferred embodiment, such detail is intended to be instructive rather than restrictive. It will be appreciated by those skilled in the art that many variations may be made in the structure and mode of operation without departing from the spirit and scope of the invention as disclosed in the teachings herein.

What is claimed is:

1. An optical scanner for scanning coded symbologies passing through a general scanning area comprising:
    means for producing a beam of light;
    a rotary polygonal mirror having a plurality of reflective surfaces for reflecting the beam toward a plurality of adjustable mirror assemblies positioned to reflect the beam onto the coded symbologies, each adjustable mirror assembly being selectively mounted such that a scanning pattern having at least two legs at an angle θ relative to one another is produced by the beam and adjustment of the mirror assemblies varies the angle θ between the legs of the scanning pattern produced by the beam;
    a detecting means for detecting light reflected by the coded symbologies; and adjustment means for adjusting a given distance between the mirror assemblies and the scanning area to permit alignment of each of the adjusted scanning patterns relative to the scanning area; and
    wherein the scanning area remains fixed during the adjustment.

2. The scanner of claim 1 wherein the means for producing a beam of light comprises a lens assembly and a laser diode.

3. The scanner of claim 1 wherein the detecting means includes a photodetector.

4. The scanner of claim 1 including four adjustable mirror assemblies.

5. The scanner of claim 4 wherein the angle θ is adjustable between approximately 20° and 90°.

6. The scanner of claim 1 including five adjustable mirror assemblies.

7. The scanner of claim 6 including the scanning pattern includes a third leg.

8. The scanner of claim 7 wherein the third leg is parallel to a direction of travel of the coded symbology past the scanner.

9. The scanner of claim 7 wherein the third leg is perpendicular to a direction of travel of the coded symbology past the scanner.

10. The scanner of claim 7 wherein the angle θ between the first two legs is adjustable between approximately 20° and 90°.

11. The scanner of claim 1 including three adjustable mirror assemblies.

12. The scanner of claim 11 wherein the scanning pattern includes a third leg.

13. The scanner of claim 12 wherein the third leg is parallel to a direction of travel of the coded symbology past the scanner.

14. The scanner of claim 12 wherein the third leg is perpendicular to a direction of travel of the coded symbology past the scanner.

15. The scanner of claim 12 wherein the angle θ between the first two legs is adjustable between approximately 5° and 20°.

16. The scanner of claim 1 including two adjustable mirror assemblies.

17. The scanner of claim 16 wherein the angle θ between the two legs is adjustable between approximately 5° and 20°.

18. The scanner of claim 1 wherein the adjustable mirror assemblies include a reflective face hingedly attached to a base plate, which is adapted to be mounted on the scanner, whereby the orientation of the reflective face relative to the beam can be adjusted.

19. An optical scanner for scanning coded symbologies comprising:
    means for producing a beam of light;
    a rotary polygonal mirror having a plurality of reflective surfaces for reflecting the beam toward a plurality of adjustable mirror assemblies positioned to reflect the beam onto the coded symbologies, each adjustable mirror assembly including a reflective face hingedly attached to a base plate whereby the orientation of the reflective face relative to the beam can be adjusted and the base plate mounted on the scanner such that the base plate can be pivotably adjusted relative to the scanner, whereby an X scanning pattern having at least two legs at an angle θ relative to one another is produced and adjustment of the mirror assemblies varies the angle θ between the legs of the scanning pattern; and
    a detecting means for detecting light reflected by the coded symbologies.

20. The scanner of claim 19 including controller means for automatic adjustment of the adjustable mirror assembly.

21. The scanner of claim 20 wherein the controller means includes an electric motor.

22. The scanner of claim 20 wherein the controller means includes a linear actuator.

23. An optical scanner for scanning coded symbologies passing through a general scanning area comprising:
    a light source for generating a laser beam;
    a rotary polygonal mirror having a plurality of reflecting portions provided thereon around an axis of rotation for reflecting the laser beam from said light source toward the coded symbologies;
    a plurality of mirror assemblies positioned to receive the reflected laser beam from said rotary polygonal mirror to produce a select scanning pattern on the coded symbologies, wherein the mirror assemblies are adjustable to vary the scanning pattern produced by the laser beam;
    a photo detector for detecting light reflected by the coded symbologies; and
    adjustment means for adjusting a given distance between the mirror assemblies and the scanning area to permit alignment of each of the adjusted scanning patterns on the scanning area; and wherein the scanning area remains fixed during the adjustment.

24. An optical scanner for scanning coded symbologies comprising:

means for producing a beam of light a rotary polygonal mirror having a plurality of reflective surfaces for reflecting the beam toward at least three mirror assemblies positioned to reflect the beam onto the coded symbologies, at least two of the mirror assemblies being adjustable mirror assemblies, the mirror assemblies selectively mounted such that a scanning pattern having at least one fixed leg and two adjustable legs at an angle $\theta$ relative to one another is produced by the beam of light and adjustment of at least one of the adjustable mirror assemblies varies the angle $\theta$ between the adjustable legs of the scanning pattern produced by the beam of light; and a detecting means for detecting light reflected by the coded symbologies.

25. The scanner of claim 24 wherein the angle $\theta$ is adjustable between approximately 20° and 90°.

26. The scanner of claim 24 wherein the angle $\theta$ is adjustable between approximately 5° and 20°.

27. The scanner of claim 24 wherein the fixed leg is parallel to a direction of travel of the coded symbologies past the scanner.

28. The scanner of claim 24 wherein the fixed leg is perpendicular to a direction of travel of the coded symbologies past the scanner.

\* \* \* \* \*

UNITED STATES PATENT AND TRADEMARK OFFICE
CERTIFICATE OF CORRECTION

PATENT NO : 5,979,761
DATED : November 9, 1999
INVENTOR(S) : Wurz et al.

It is certified that error appears in the above-identified patent and that said Letters Patent is hereby corrected as shown below:

IN THE CLAIMS

In Claim 7, at Column 7, line 57, delete "including" and insert --wherein-- therefore.

Signed and Sealed this

Seventeenth Day of October, 2000

*Attest:*

Q. TODD DICKINSON

*Attesting Officer*   *Director of Patents and Trademarks*